Nov. 5, 1929.  H. F. PAUL  1,734,743
NUT LOCK
Filed Aug. 2, 1928
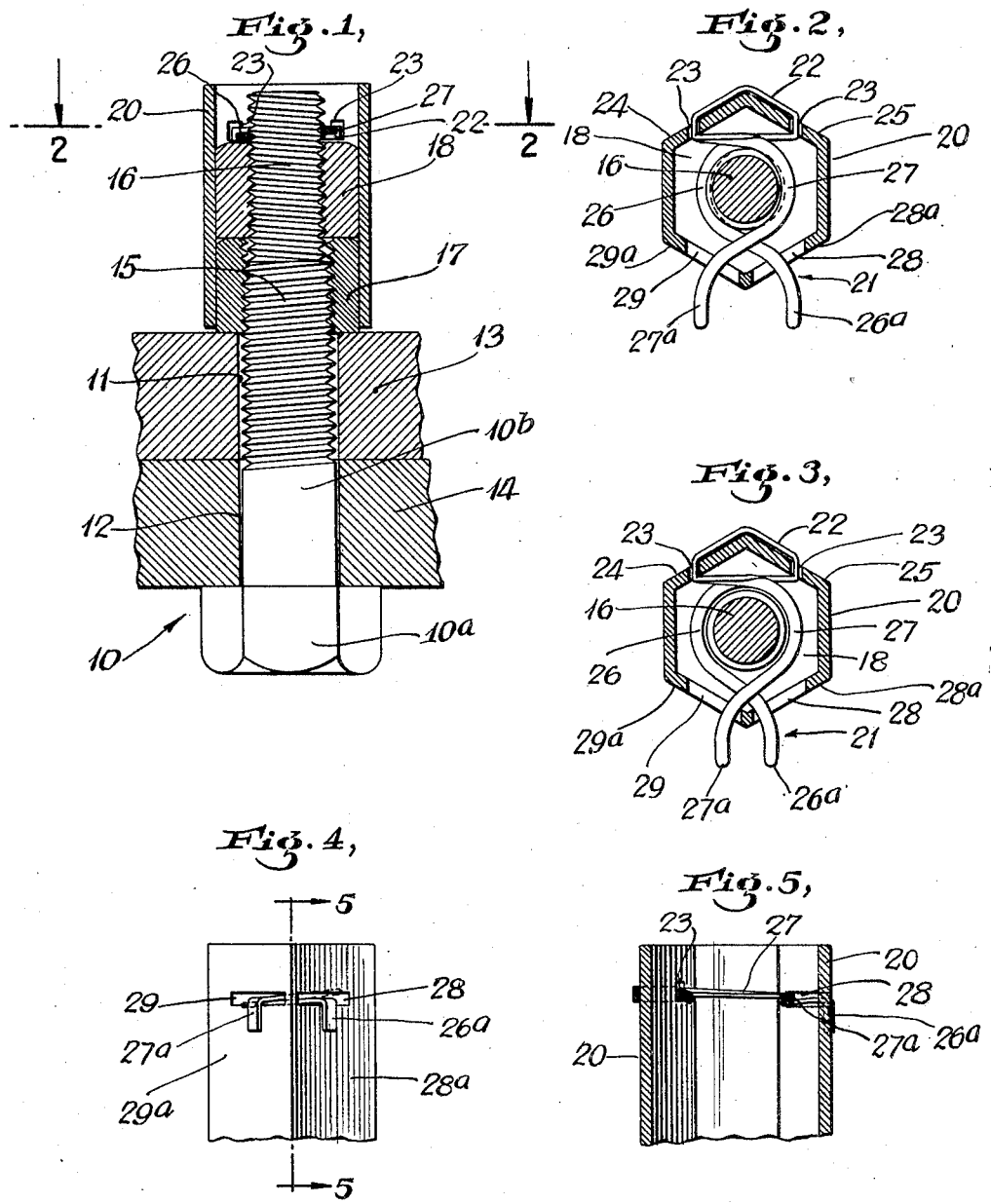
Henry F. Paul
INVENTOR.
BY Morris Finkelstein
ATTORNEYS.

Patented Nov. 5, 1929

1,734,743

UNITED STATES PATENT OFFICE

HENRY F. PAUL, OF ASTORIA, NEW YORK

NUT LOCK

Application filed August 2, 1928. Serial No. 296,913.

This invention relates to nut-locks.

Among the objects of this invention is to provide a device of the character described which shall be simple and rugged in construction, inexpensive to manufacture and which shall yet be practical and efficient to a high degree.

Other objects of this invention will in part be obvious and in part hereinafter pointed out.

This invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a longitudinal sectional view of the lock nut construction embodying the present invention;

Fig. 2 is a cross-sectional view taken on line 2—2 of Fig. 1;

Fig. 3 is a view similar to Fig. 2 showing the spring clamp actuated to disengage from the bolt threads;

Fig. 4 is a fragmentary view of the sleeve showing the clamp handle bent against the outer surface of the sleeve; and Fig. 5 is a cross-sectional view taken on line 5—5 of Fig. 4.

Referring in detail to the drawing, 10 designates a bolt having a head $10^a$ and a shank $10^b$ extending thru suitable openings 11, 12 in plates 13, 14 respectively. Said shank $10^b$ is provided with a threaded portion 15 and a reduced end portion 16, said reduced end portion 16 preferably being threaded oppositely to portion 15. As seen in Fig. 1, the threaded portion 15 receives an inner nut 17 properly threaded interiorly for screwing on said portion to bolt the plates 13 and 14 together. The reduced end portion 16 may receive an outer or jam nut 18 interiorly threaded for screwing on said end portion to prevent the nut 17 from accidentally unscrewing. The nuts 17 and 18 are preferably polygonal and of the same outer configuration. Means is provided to lock the nuts 17 and 18 on the shank $10^a$ of bolt 10 irrespective of the bending action between said nuts. To this end, a sleeve 20 is provided having a shape corresponding to the shape of the nuts 17, 18 and snugly fitted over said nuts when registering with one another. The sleeve 20 is shown to be of hexagonal cross-section as are the nuts 17, 18. It is understood however, that said parts may be of any desired configuration. When fitted on the nuts 17, 18 as shown in Fig. 1, the sleeve 20 prevents relative rotation between said nuts.

Means is provided for locking the sleeve 20 to the nuts 17, 18. Said means comprises a spring clamp 21 having a looped portion 22 extending thru openings 23 in adjacent walls 24, 25 of the sleeve near the outer end of the sleeve. Said clamp is provided with semi-circular jaws 26, 27 extending from said looped portion 22, adapted to grip the threads of reduced portion 16. Curved handles $26^a$, $27^a$ extend from jaws 26, 27 respectively in cross-relation and project thru slots 28, 29 in adjacent walls $28^a$, $29^a$ of said sleeve 20. The slots 28, 29 and openings 23 are in the same planes transverse to the axis of the bolt 10.

The clamp 20 is preferably made of a strip of spring metal shaped as described above. The jaws 26, 27 normally tend to grip the reduced portion 16 between the threads thereof as shown in Figs. 1 and 2, thus preventing shifting or displacement of the sleeve after the nut lock has been applied.

To remove the sleeve 20 for permitting loosening of the nuts 17, 18, the handle $26^a$, $27^a$ may be pressed inwardly to the position shown in Fig. 3. This movement will open the jaws 26, 27 and thus release the clamp from the threads of portions 16. The sleeve may then be slid off the nuts 17, 18. Said nuts may thereafter be removed from the shank $10^b$ by unscrewing in the proper direction.

The portion of the handle $26^a$, $27^a$ extending thru the slots 28, 29 may be bent to lie against the walls $28^a$, $29^a$ of said sleeve 20 as shown in Figs. 4 and 5. The handles will thus be out of the way where they may not be accidentally actuated to release position.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing it to be interpreted as illustrative and not in a limiting sense.

Having thus described my invention, I claim as new and desire to secure by Letters Patent:—

1. In nut lock construction of the character described, in combination, a bolt provided with a threaded shank portion, a nut screwed on said portion, and means to lock said nut on said shank, said means including a sleeve fitted on said nut and a spring clamp adapted to engage the threads of said shank portion said clamp being attached to said sleeve and having handle portions extending through said sleeve.

2. In nut lock construction of the character described, in combination, a bolt having a threaded shank portion and terminating in a reduced oppositely threaded shank portion, a nut screwed on said first mentioned shank portion, a jam nut screwed on said reduced portion, and means for locking said nuts, said means including a sleeve member fitted on said nuts, and a spring clamp attached to said sleeve adapted to engage the threads of the reduced portion to prevent shifting of said sleeve adapted to engage the threads of the reduced portion to prevent shifting of said sleeve member, said clamp member having handle portions extending thru said sleeve and bent against the outer surface of said wall.

3. In nut lock construction of the character described, the combination of a bolt having a threaded shank portion, a nut on said portion, a sleeve member on said nut, and means attached to said member and coacting with the threads on said portion and preventing shifting of said member, said means comprising a spring clamp having handle portions extending beyond said sleeve member.

4. In nut lock construction of the character described, in combination, a bolt provided with a shank having oppositely threaded portions, nuts screwed on said portions, a sleeve member fitted on said nuts, and means attached to said member coacting with the threads of said shank to prevent shifting of said member, said means comprising a strip of spring material looped about a portion of said sleeve and shaped to provide a pair of jaws normally tending to tightly grip said shank.

5. In nut lock construction of the character described, in combination, a bolt having a threaded shank portion and terminating in a reduced oppositely threaded shank portion, a nut screwed on said first mentioned shank portion, a jam nut screwed on said reduced portion, and means for locking said nuts, said means including a sleeve member fitted on said nuts, and a spring clamp attached to said sleeve adapted to engage the threads of the reduced portion to prevent shifting of said sleeve member, said clamp having crossed handle portions, said sleeve being formed with slots for receiving said handle portions.

In testimony whereof I affix my signature.

HENRY F. PAUL.